United States Patent
Cocchi et al.

(10) Patent No.: US 8,243,925 B2
(45) Date of Patent: Aug. 14, 2012

(54) METHOD AND APPARATUS FOR SUPPORTING MULTIPLE BROADCASTERS INDEPENDENTLY USING A SINGLE CONDITIONAL ACCESS SYSTEM

(75) Inventors: Ronald P. Cocchi, Seal Beach, CA (US); Gregory J. Gagnon, Redondo Beach, CA (US); Dennis R. Flaharty, Irvine, CA (US)

(73) Assignee: Syphermedia International, Inc., Aliso Viejo, CA (US)

( * ) Notice: Subject to any disclaimer, the term of this patent is extended or adjusted under 35 U.S.C. 154(b) by 1417 days.

(21) Appl. No.: 11/795,272

(22) PCT Filed: Oct. 18, 2005

(86) PCT No.: PCT/US2005/037197
§ 371 (c)(1),
(2), (4) Date: Jul. 13, 2007

(87) PCT Pub. No.: WO2006/044765
PCT Pub. Date: Apr. 27, 2006

(65) Prior Publication Data
US 2008/0095365 A1    Apr. 24, 2008

Related U.S. Application Data

(60) Provisional application No. 60/619,663, filed on Oct. 18, 2004.

(51) Int. Cl.
*H04N 7/167* (2011.01)
(52) U.S. Cl. ........ 380/228; 380/201; 380/239; 380/277; 726/20; 713/189; 713/193

(58) Field of Classification Search ................... 380/228, 380/278, 201, 240, 242, 277, 284; 725/28, 725/25, 31; 713/189, 193, 194; 726/19, 726/20
See application file for complete search history.

(56) References Cited

U.S. PATENT DOCUMENTS

| 4,757,534 A | 7/1988 | Matyas et al. |
| 5,790,663 A | 8/1998 | Lee et al. |

(Continued)

FOREIGN PATENT DOCUMENTS
EP   1555822   7/2005
(Continued)

OTHER PUBLICATIONS

PCT/US2005/037197 International Search Report and Written Opinion.

(Continued)

*Primary Examiner* — Kim Vu
*Assistant Examiner* — Baotran N To
(74) *Attorney, Agent, or Firm* — Gates & Cooper LLP

(57) ABSTRACT

A method and apparatus for brokering the enablement of the communication of encrypted media programs from a plurality of independent broadcasters to a plurality of receivers is disclosed. The system makes use of a pairing key for each provided service, which is differently encrypted by a pairing server and by the broadcaster providing the service. The encrypted versions of the pairing key are decrypted in a first receiver module using information known to the pairing service but not the broadcaster and in a second receiver module using information known to the broadcaster. The pairing key is used to cryptographically bind the first and second receiver modules.

35 Claims, 11 Drawing Sheets

U.S. PATENT DOCUMENTS

| | | | |
|---|---|---|---|
| 5,940,504 A | 8/1999 | Griswold | |
| 6,240,401 B1 | 5/2001 | Oren et al. | |
| 6,243,468 B1 | 6/2001 | Pearce et al. | |
| 6,285,774 B1 | 9/2001 | Schumann et al. | |
| 6,393,128 B1 * | 5/2002 | Rix et al. | 380/283 |
| 6,550,011 B1 | 4/2003 | Sims, III | |
| 6,681,212 B1 | 1/2004 | Zeng | |
| 6,931,545 B1 | 8/2005 | Ta et al. | |
| 6,957,344 B1 | 10/2005 | Goldshlag et al. | |
| 7,007,170 B2 | 2/2006 | Morten | |
| 7,174,512 B2 * | 2/2007 | Martin et al. | 715/719 |
| 7,295,681 B2 | 11/2007 | Lubin et al. | |
| 7,328,345 B2 | 2/2008 | Morten et al. | |
| 7,356,143 B2 | 4/2008 | Morten | |
| 7,376,233 B2 | 5/2008 | Candelore et al. | |
| 7,409,562 B2 | 8/2008 | Kahn et al. | |
| 7,548,624 B2 | 6/2009 | Kahn et al. | |
| 7,565,546 B2 * | 7/2009 | Candelore | 713/182 |
| 7,580,523 B2 | 8/2009 | Kahn et al. | |
| 7,599,494 B2 | 10/2009 | Kahn et al. | |
| 7,684,409 B2 | 3/2010 | Godwin et al. | |
| 7,797,552 B2 | 9/2010 | Kahn et al. | |
| 2002/0018568 A1 * | 2/2002 | Weaver et al. | 380/241 |
| 2002/0021805 A1 | 2/2002 | Schumann et al. | |
| 2002/0067914 A1 | 6/2002 | Schumann et al. | |
| 2002/0094084 A1 | 7/2002 | Wasilewski et al. | |
| 2003/0026433 A1 * | 2/2003 | Matt | 380/278 |
| 2003/0046568 A1 | 3/2003 | Riddick et al. | |
| 2003/0061477 A1 * | 3/2003 | Kahn et al. | 713/150 |
| 2004/0010717 A1 | 1/2004 | Simec et al. | |
| 2004/0034582 A1 | 2/2004 | Gilliam et al. | |
| 2004/0039704 A1 | 2/2004 | Gilliam et al. | |
| 2004/0044891 A1 * | 3/2004 | Hanzlik et al. | 713/150 |
| 2004/0078575 A1 | 4/2004 | Morten et al. | |
| 2004/0107356 A1 | 6/2004 | Shamoon et al. | |
| 2004/0133803 A1 | 7/2004 | Rabin et al. | |
| 2004/0184616 A1 | 9/2004 | Morten | |
| 2005/0005098 A1 | 1/2005 | Michaelis et al. | |
| 2005/0172122 A1 | 8/2005 | Risan et al. | |
| 2005/0278257 A1 | 12/2005 | Barr et al. | |
| 2006/0005253 A1 | 1/2006 | Goldshlag et al. | |
| 2006/0010500 A1 | 1/2006 | Elazar et al. | |
| 2006/0101287 A1 | 5/2006 | Morten | |
| 2006/0143481 A1 | 6/2006 | Morten | |
| 2006/0159303 A1 | 7/2006 | Davis et al. | |
| 2006/0239503 A1 | 10/2006 | Petrovic et al. | |
| 2007/0033419 A1 | 2/2007 | Kocher et al. | |
| 2008/0279386 A1 | 11/2008 | Kahn et al. | |

FOREIGN PATENT DOCUMENTS

| | | |
|---|---|---|
| EP | 1575291 | 9/2005 |
| EP | 1585329 A2 * | 10/2005 |
| WO | WO 99/43120 | 8/1999 |
| WO | WO99/53689 | 10/1999 |
| WO | WO02/01333 | 1/2002 |

OTHER PUBLICATIONS

Cinea press release "Cinea, Inc. to Provide IFE Key Management Servies for Universal Pictures and Twentieth Century Fox" Sep. 9, 2003.

DRM Watch Magazine Article "Cinea DRM for DVDs Endorsed for Oscar Screeners", Jul. 8, 2004.

Digital lifestyles Magazine Article "Secure DVD Players for BAFTA Judges", Aug. 31, 2004.

EP Office Action dated Jan. 13, 2011, Application No. 05811812.6.
Response to EP Office Action dated Jan. 13, 2011.

* cited by examiner

| STB ID | S1 | BDCST ID | GEN SRVC | IPPV | OPPV A | OPPV B |
|---|---|---|---|---|---|---|
| A1A1 | #1 | A | $Kp_{0001}$ | $Kp_{0002}$ | $Kp_{0003}$ | $Kp_{0004}$ |
| A1A1 | #1 | B | $Kp_{0201}$ | $Kp_{0202}$ | $Kp_{0203}$ | $Kp_{0204}$ |
| A1A2 | #2 | A | $Kp_{0301}$ | $Kp_{0302}$ | $Kp_{0303}$ | $Kp_{0404}$ |
| A1A3 | #3 | B | $Kp_{0401}$ | $Kp_{0402}$ | $Kp_{0403}$ | $Kp_{0404}$ |
| A1A4 | #4 | A | $Kp_{0501}$ | $Kp_{0502}$ | $Kp_{0503}$ | $Kp_{0504}$ |
| ... | ... | ... | ... | ... | ... | ... |
| Z9Z9 | ## | A | Kp | Kp | Kp | Kp |

*FIG. 5B*

| STB ID | BDCST ID = A | GEN SRVC | IPPV | OPPV A | OPPV B |
|---|---|---|---|---|---|
| A1A1 | A | $Kp_{0001}$ | $Kp_{0002}$ | $Kp_{0003}$ | $Kp_{0004}$ |
| A1A2 | A | $Kp_{0301}$ | $Kp_{0302}$ | $Kp_{0303}$ | $Kp_{0304}$ |
| Z1A1 | A | $Kp_{1301}$ | $Kp_{1302}$ | $Kp_{1303}$ | $Kp_{1404}$ |
| A112 | A | $Kp_{1401}$ | $Kp_{1402}$ | $Kp_{1403}$ | $Kp_{1404}$ |
| A1A5 | A | $Kp_{1501}$ | $Kp_{1502}$ | $Kp_{1503}$ | $Kp_{1504}$ |
| ... | ... | ... | ... | ... | ... |
| Z9Z9 | A | Kp | Kp | Kp | Kp |

*FIG. 5C*

METHOD AND APPARATUS FOR SUPPORTING MULTIPLE BROADCASTERS INDEPENDENTLY USING A SINGLE CONDITIONAL ACCESS SYSTEM

CROSS-REFERENCE TO RELATED APPLICATIONS

This application is a national phase application of International Patent Application No.: PCT/US2005/037197, entitled "METHOD AND APPARATUS FOR SUPPORTING MULTIPLE BROADCASTERS INDEPENDENTLY USING A SINGLE CONDITIONAL ACCESS SYSTEM," by Ronald P. Cocchi, Gregory J. Gagnon, and Dennis R. Flaharty, filed Oct. 18, 2005, which claims benefit of U.S. Provisional Patent Application No. 60/619,663, entitled "METHOD OF SUPPORTING MULTIPLE BROADCASTERS INDEPENDENTLY USING A SINGLE CONDITIONAL ACCESS SYSTEM," by Ronald P. Cocchi Gregory J. Gagnon, and Dennis R. Flaharty, filed Oct. 18, 2004, which application is hereby incorporated by reference herein.

BACKGROUND OF THE INVENTION

1. Field of the Invention

The present invention relates to systems and methods for providing conditional access to media programs, and in particular to a system and method for providing for such conditional access between multiple independent broadcasters and a plurality of customers using a single conditional access system.

2. Description of the Related Art

For many years, media programs such as television and radio programs have been broadcast to viewers/listeners free of charge. More recently, this free-of-charge dissemination model has been augmented with a fee-for-service and/or fee-for-view model in which paying subscribers are provided access to a greater variety and number of media programs, including video programs, audio programs and the like, by cable, satellite and terrestrial broadcasts.

However, while subscriber-based services are readily available in some areas, they are not available on a worldwide basis. Further, in current media program subscription business models, subscribers are typically offered services from a small number of providers (e.g. DIRECTV or ECHOSTAR, or the approved local cable provider) each of which typically provide a large number of media channels from a variety of sources (e.g. ESPN, HBO, COURT TV, HISTORY CHANNEL). To assure that only subscribers receive the media programs, each service provider typically encrypts the program material and provides equipment necessary for the customer to decrypt them so that they can be viewed.

Since they provide a large number of programs and typically at a relatively high cost, the vast majority of customers subscribe to only one of the foregoing services (e.g. DIRECTV, ECHOSTAR, or the local cable provider), but not multiple providers. It is expected that future business models will evolve to the point where customers will subscribe to more than one media provider, each of which provides a smaller number of media channels. The foregoing is especially true in areas where subscriber-based services are in their infancy, including for example, large parts of Asia, Africa, and South America.

One of the roadblocks to the evolution of such services is the means by which the service provider assures that only paying customers receive their media programs. Existing conditional access systems are not compatible with each other, and it is thought to be prohibitively expensive for each provider of a limited number of media programs to produce and provide its own conditional access system to potential subscribers. Another problem is that customers would typically prefer to receive all media programs through a single device (and hence, a single conditional access system), rather than multiple such systems. Accordingly, there is a need in the art for a method and apparatus that allows multiple program providers (e.g. broadcasters) to transmit media programs to paying subscribers via a single conditional access system. The present invention satisfies that need.

SUMMARY OF THE INVENTION

To address the requirements described above, the present invention discloses a method, apparatus, article of manufacture for brokering the enabling of communication of encrypted media programs from a plurality of independent broadcasters to a plurality of receivers, each encrypted media program decryptable by a first receiver module securely communicating with a second receiver module according to a pairing key associated with one of the plurality of receivers. In one disclosed embodiment, the method comprises the steps of transmitting a service enabling request from one of the plurality of broadcasters to a broker independent from the one of the plurality of broadcasters, the request comprising an identification of the one of the plurality of receivers; receiving a first encrypted version of the pairing key $E_{S_1}[K_p]$ from the broker, the first encrypted version of the pairing key $E_{S_1}[K_p]$ decryptable by first information $S_1$ securely stored in the first receiver module of the one of the plurality of receivers; generating a second encrypted version of the pairing key $K_p$, the second encrypted version of the pairing key $E_{S_2}[K_p]$ decryptable by second information $S_2$ securely stored in the second receiver module; and transmitting the first encrypted version of the pairing key $E_{S_1}[K_p]$ and the second encrypted version of the pairing key $E_{S_2}[K_p]$ to the one of the plurality of receivers. In another disclosed embodiment, the apparatus is described by system for brokering the enabling of communication of encrypted media programs from a plurality of independent broadcasters to a plurality of receivers, each encrypted media program decryptable by a first receiver module securely communicating with a second receiver module according to a pairing key $K_p$ associated with one of the plurality of receivers. The system comprises a broker, for providing a first encrypted version of the pairing key $E_{S_1}[K_p]$ in response to a service enabling request from one of the plurality of broadcasters, the service request having an identification of one of the plurality of receivers, wherein the first encrypted version of the pairing key $E_{S_1}[K_p]$ is decryptable by first information $S_1$ stored in the first receiver module.

BRIEF DESCRIPTION OF THE DRAWINGS

Referring now to the drawings in which like reference numbers represent corresponding parts throughout:

FIG. 5B is a diagram illustrating an embodiment of a table stored in the pairing system;

FIG. 5C is a diagram illustrating an embodiment of a table stored by the service provider;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
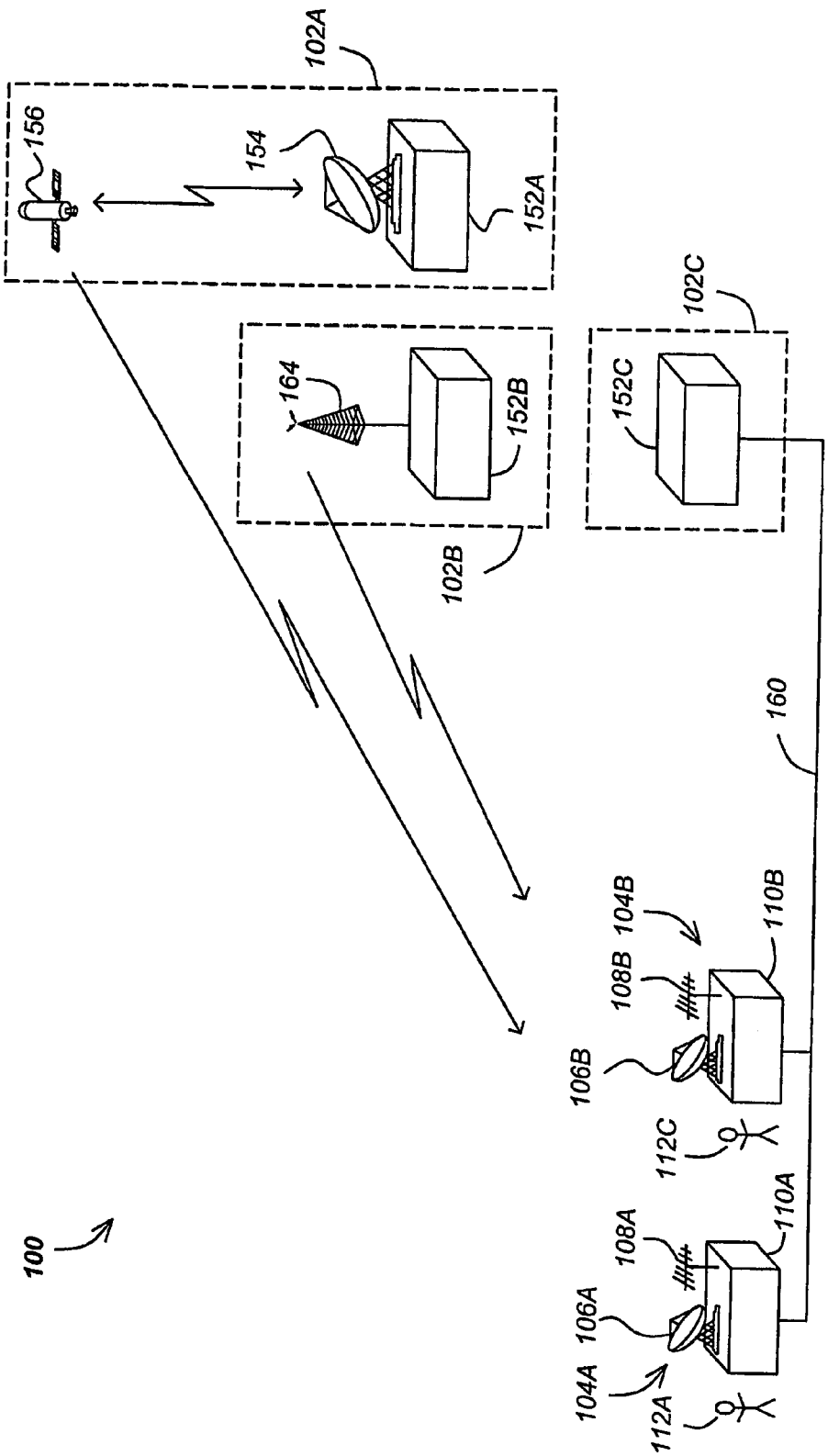
FIG. 1 is a diagram illustrating a media program distribution system.

FIG. 1 is a diagram illustrating a media program distribution system 100. The system 100 includes a plurality of service providers (hereinafter alternatively referred to as broadcasters) 102, including a first service provider 102A that broadcasts media programs from a satellite broadcast facility 152A via one or more uplink antennas and one or more satellites 156, a second service provider 102B, that broadcasts media programs from terrestrial broadcast facility 152B and one or more terrestrial antennas 164, and a third service provider 102C that broadcasts media programs via a cable link 160.

The system 100 also comprises a plurality of subscriber stations 104A, 104B (alternatively referred to hereinafter as subscriber station 104), each providing service to one or more subscribers 112A, 112B (alternatively referred to hereinafter as subscribers 112). Each subscriber station 104A, 104B may include a satellite reception antenna 106A, 106B (alternatively referred to hereinafter as satellite reception antenna 104) and/or a terrestrial broadcast antenna 108A, 108B (alternatively referred to hereinafter as terrestrial broadcast antenna 108) communicatively coupled to a receiver 110A, 110B (alternatively referred to hereinafter as receiver 110), which is also known as a set top box (STB) or an integrated receiver/decoder (D).

As described above, in prior art systems, each receiver 110A, 110B (or at least, each conditional access system used with each receiver) is capable of receiving subscriber-based media programs from only one of the media program providers 102. Hence, if a subscriber 112 wanted to receive media programs from more than one media program provider 102 on a subscription basis, the subscriber may need not only to have a multiple receivers 110 at the subscriber station 104A, but also, will require multiple conditional access systems.

Figure 2:
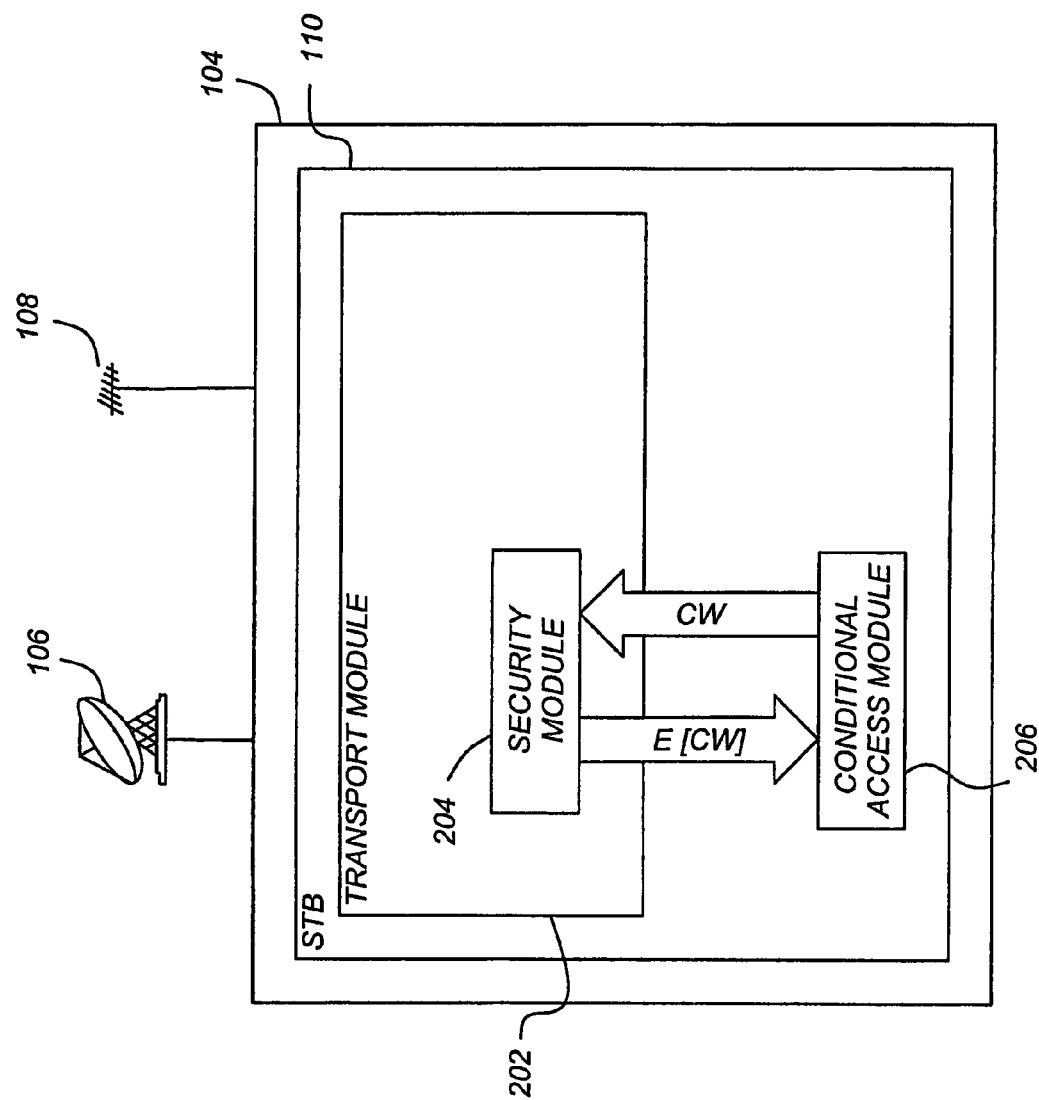
FIG. 2 is a diagram of a typical subscriber station.

FIG. 2 is a diagram of a typical subscriber station 104. Each station 104 includes at least one receiver or STB 110, which itself includes a transport module 202 that communicates with a conditional access module (CAM) 206. In one embodiment, the CAM 206 is a smart card that is removably communicatively coupleable to the transport module 202 and hence, the STB 110. In another embodiment, the CAM 206 is a device such as a chip or a collection of devices that are physically integrated with the STB 110 and irremovable. To assure that only those who subscribe to the service are provided with media programs, the service providers typically encrypt the media program M with a control word CW, thus producing and encrypted program $E_{CW}[M]$, and transmit the encrypted media program $E_{CW}[M]$ and an encrypted version of the control word E[CW] to the receiver 110. The receiver 110 receives both the encrypted program $E_{CW}[M]$ and the encrypted control word E[CW]. The transport module 202 analyzes the incoming data stream and passes the encrypted control E[CW] to the CAM 206, which decrypts the control word CW and returns the decrypted control word CW to a security module 204 or similar device in the transport module 202. The security module 204 then uses the control word CW to decrypt the encrypted media program $E_{CW}[M]$ to produce the media program M for presentation to the subscriber. This system assures that only those who are in possession of a valid CAM 206 can receive and decode media programs. However, it does not prevent the use of the CAM 206 in any other STB 110. Hence, if the CAM 206 is compromised or duplicated, unauthorized access to media programs is possible.

Figure 3:
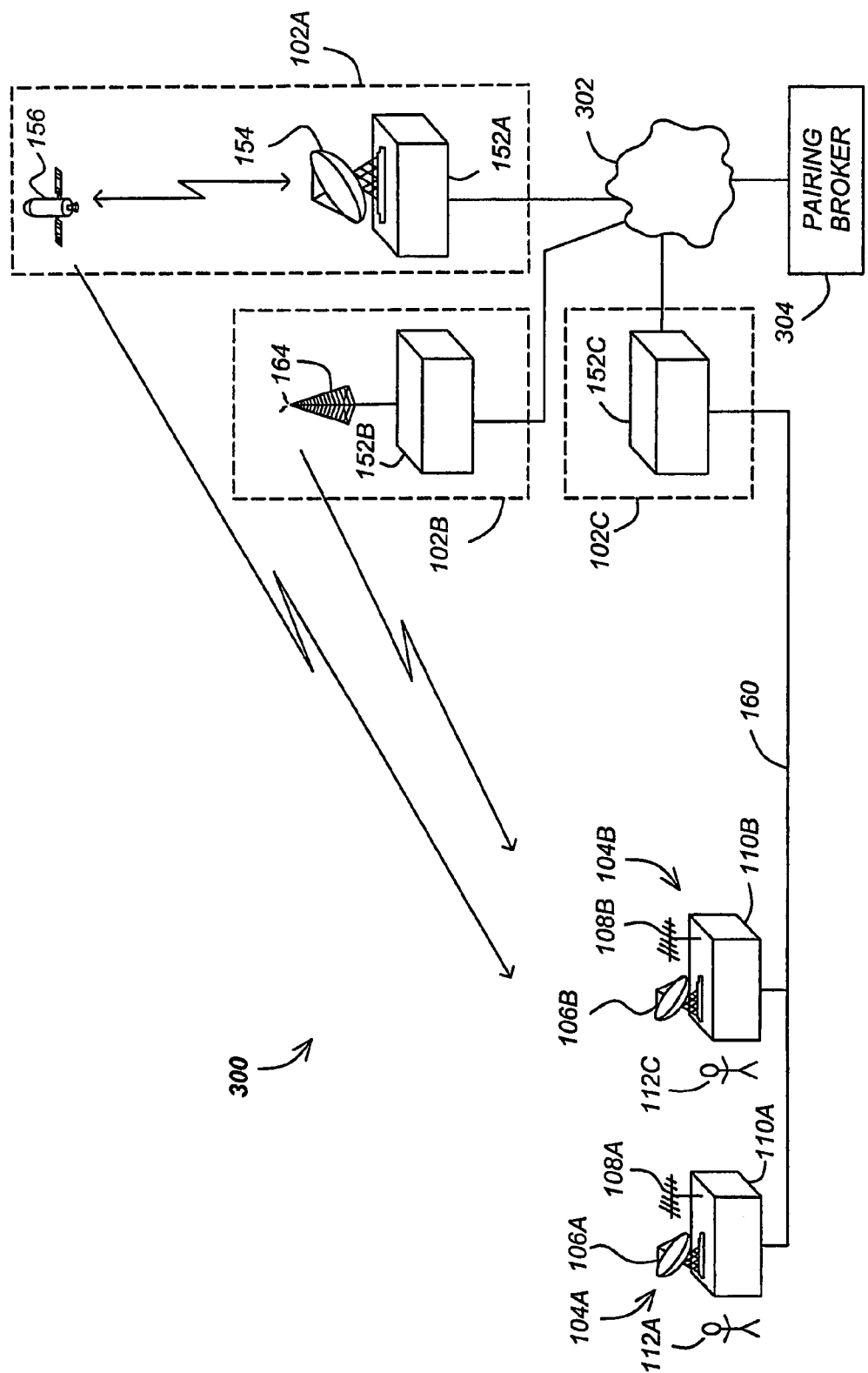
FIG. 3 is a diagram illustrating a multiple broadcaster media program distribution system.

FIG. 3 is a diagram illustrating a multiple broadcaster Conditional Access Subscriber Administration System (CA-SAS) 200. The MB system 200 is similar to that which is disclosed in FIG. 1, but includes a pairing broker 304, which can communicate with the broadcast facilities 152 via a communications medium 302 such as the Internet.

FIGS. 4A-4D are diagrams illustrating one embodiment of how the pairing broker 304 cooperatively operates with multiple service providers 102 and equipment at the subscriber stations 104 to implement a conditional access system. FIGS. 4A-4D will be described in connection with and with reference to FIGS. 5 and 6, which illustrate one embodiment of the service provider 102 elements and STB 110 elements, respectively.

Figure 4A:
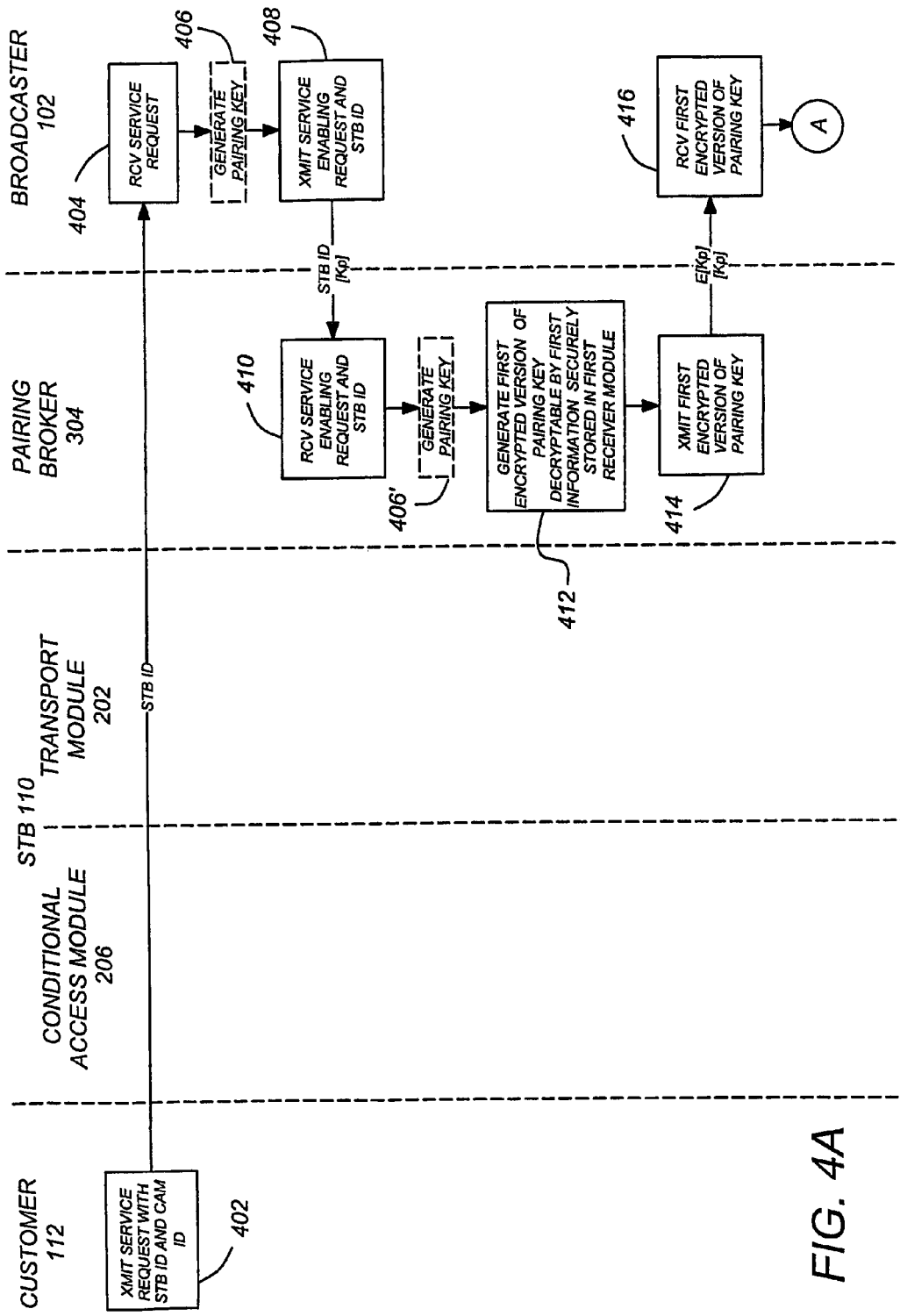
FIGS. 4A-4D are diagrams illustrating one embodiment of how the paring system cooperatively operates with multiple service providers and equipment at the subscriber stations to implement a conditional access system.
Figure 4B:
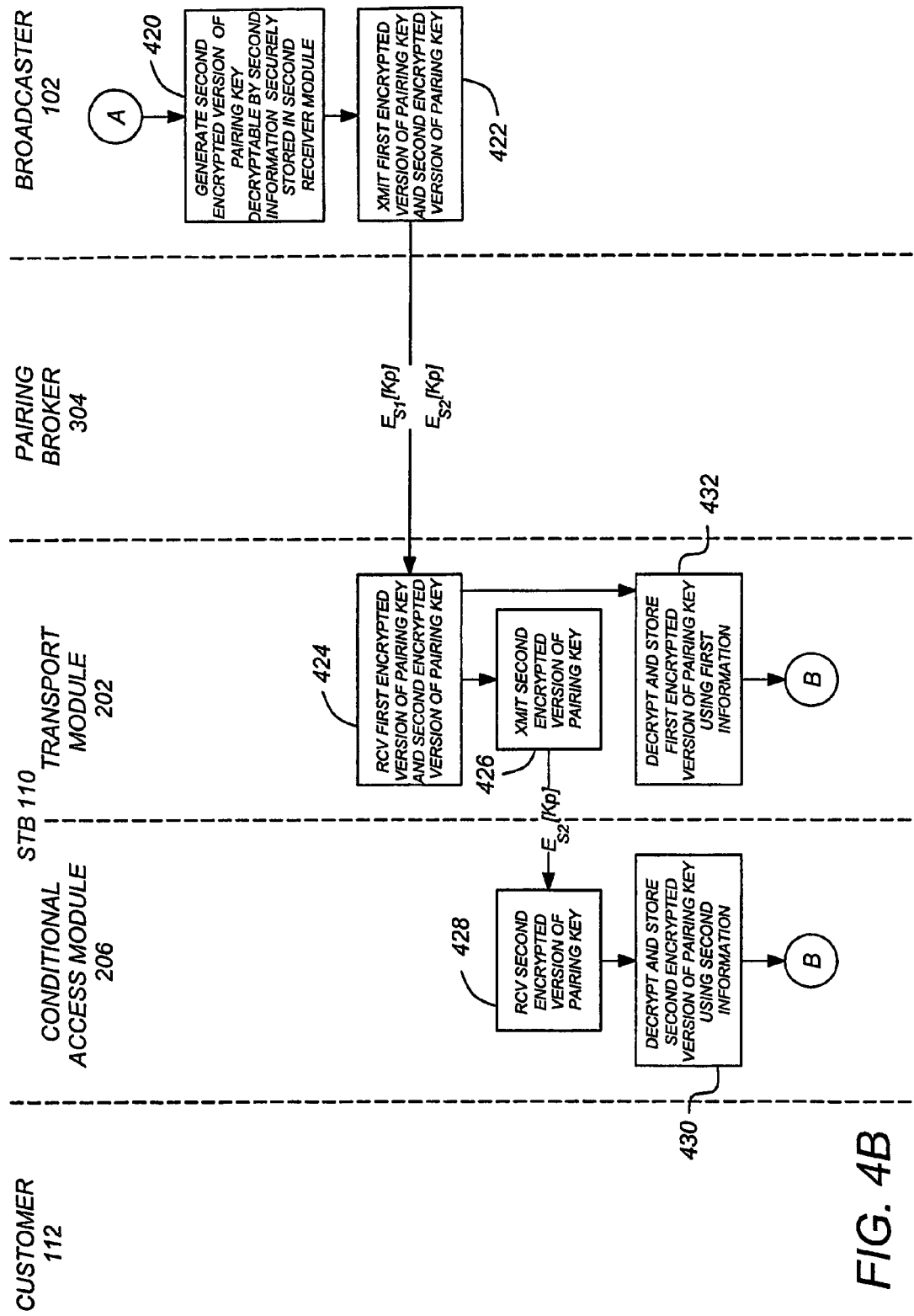
Figure 4C:
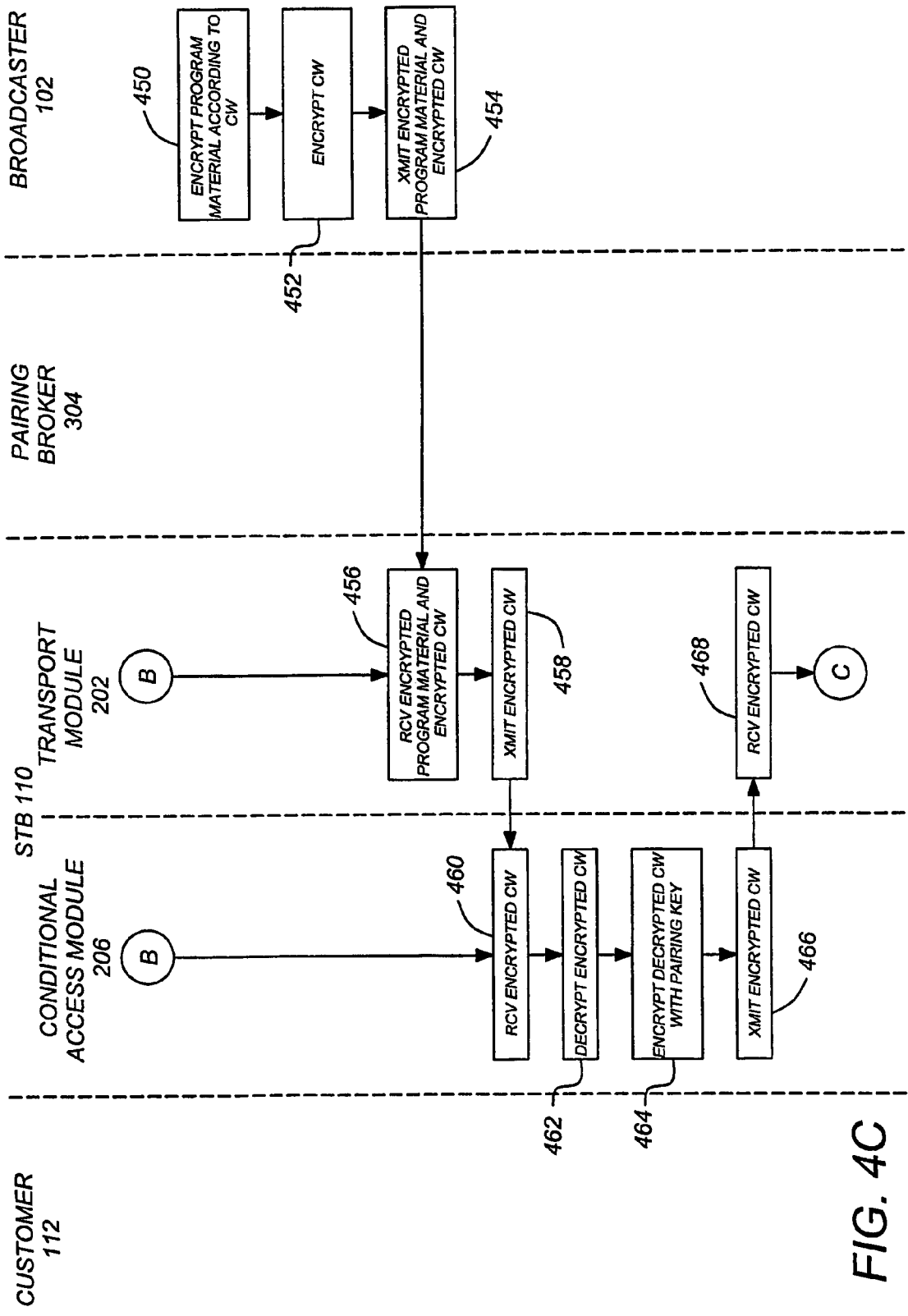
Figure 4D:
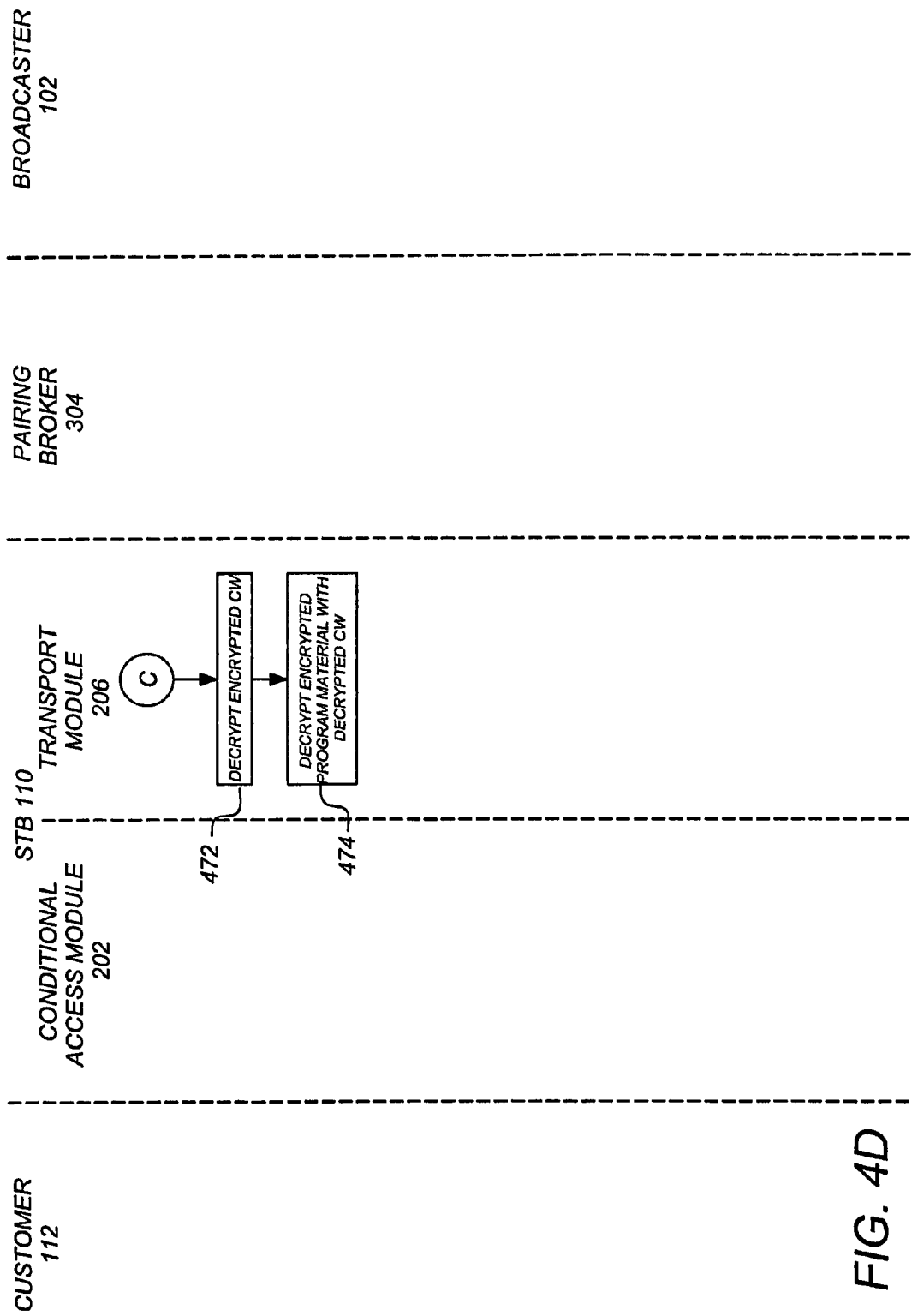

FIG. 4A begins with a potential customer 112 who has decided to subscribe a media program service offered by a service provider 102. To do so, the subscriber contacts the service provider 102 and transmits information sufficient to identify the STB and the CAM to the service provider 102, as shown in block 402. In one embodiment, this information includes an STB 110 unique identifier (ID) (such as a serial number or other designation) and a CAM 206 unique identifier (CAM ID). In a preferred embodiment, this is accomplished by transmitting the information via the Internet 302 or similar network.

This can be accomplished by use of a web browser implemented in a computer 512 disposed at the subscriber station 104 and a web transaction module 502 implemented at the service provider 102. If desired, the subscriber's web browser can include the appropriate references to the URL where the request and STB ID and CAM ID should be transmitted. In one embodiment, in addition to the STB ID, the potential subscriber also transmits his/her credit card information (e.g. the account number) as well. This allows for services to be automatically billed for monthly subscription fees without further interaction. Credit card payment administration can be performed by the service provider 102 or by a third party such as PAYPAL. These functions can be performed by the subscriber administration module (SAM 504. The SAM 504 can also comprise or be integrated with a customer relationship management (CRM) system or systems. If access is approved (e.g. if the supplied credit card information has been verified), the subscriber administration module 504 directs the web transaction module 502 to request a pairing key $K_p$ from the pairing broker 304.

This implementation reduces the support requirements for the service provider 102. In other embodiments, the potential customer 112 can contact the service provider 102 via telephone or other means and provide the service request, STB ID, and CAM ID. Further, if desired, the pairing broker 304 can receive the service request (preferably via an appropriate Internet interface) and forward the request for service and the appropriate identifying information to the service provider 102.

The service provider 102 receives the service request the identifying information, as shown in block 404. The service provider 102 then transmits an enabling service request and the STB ID to the pairing broker 304, as shown in block 408. In block 410, the pairing broker 304 receives the service enabling request and the STB ID. A first encrypted version of a pairing key $K_p$ is then provided. The pairing key $K_p$ was generated either in block by the service provider 102, as shown in block 406 or, preferably by the pairing broker 304, as shown in block 406'. The first encrypted version of the pairing key $K_p$ is provided so as to be decryptable using first information $S_1$ securely stored in a first receiver module such as the transport module 202 shown in FIG. 6 (the first encrypted version of the pairing key $K_p$ therefore described as $E_{S_1}[K_p]$). In one embodiment, this is accomplished by use of a secret that is known to the pairing broker 304, but unknown to the service provider 102. The STB IDs and related first information $S_1$ can be stored in a table or a database 514 in the pairing broker 304. If desired, the related first encrypted versions of the pairing key $E_{S_1}[K_p]$ can be stored as well.

In block 414, the first encrypted version of the pairing key $E_{S_1}[K_p]$ is transmitted to the service provider 102. If the pairing key $K_p$ was generated by the pairing broker 304, the pairing key $K_p$ is also transmitted to the service provider 102. One of both of the first encrypted version of the pairing key $E_{S_1}[K_p]$ and the pairing key $K_p$ can be securely transmitted to the service provider 102 via a shared secret, a private key, or a public/private key security paradigm, if desired.

The foregoing process can be used to request all services from a service provider with a single pairing key $K_p$ or repeated to request other services from the service provider 102, with each service enabled and controlled via a different pairing key $K_p$. For example, the service provider 102 may provide both general services (e.g. access to a number of channels as a part of a baseline fee service) and pay-per-view services (e.g. access to a particular program or set of programs on a pay-pet-view basis). Therefore, if the foregoing process was undertaken to subscribe to the general services and the potential subscriber 112 desires order ahead pay per view (OPPV) services or impulse pay per view (IPPV) services as well the foregoing process can be repeated for those services, resulting in the provision of a first encrypted version of a different pairing key for each service. The system 200 has the ability to store credit information in the security module 204, CAM 206, or elsewhere, and can therefore limit the amount of IPPV events the subscriber can purchase prior to requesting additional credits. Finally, the potential subscriber 112 can repeat this process for each service provider 102 from which they wish to receive service.

Figure 5A:
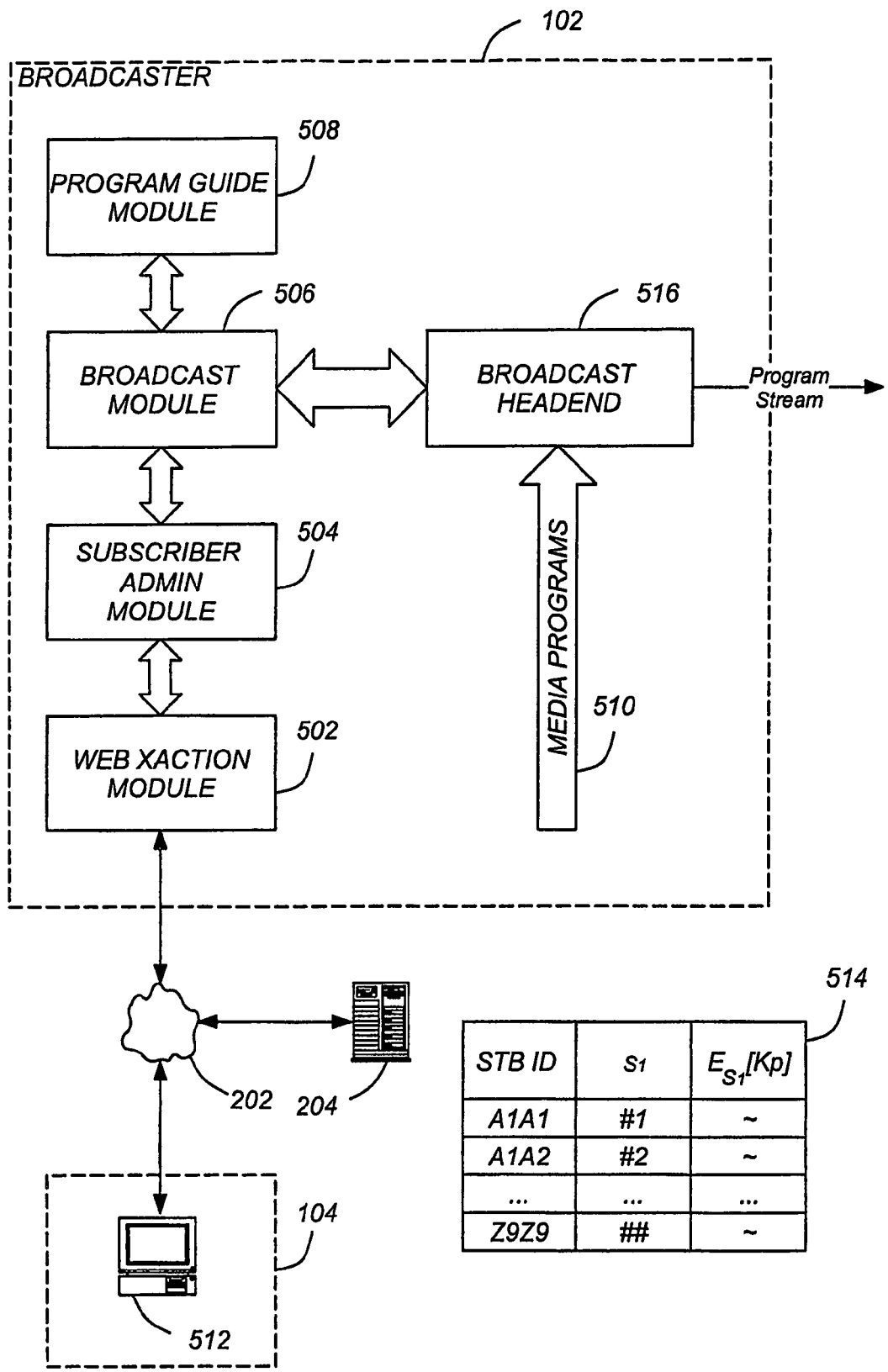
FIG. 5A is a diagram illustrating one embodiment of the service provider.

Although the pairing broker 304 need not generate or store the pairing keys $K_p$, it may be desirable to do so. FIG. 5B is a diagram showing a table that might be used to store and relate the STB ID to first information $S_1$, a service provider 102 identifier (BDCST ID), and pairing keys for general services, IPPV, and multiple OPPV services. In block 420, the service provider 102 receives the first encrypted version of the pairing key $K_p$, and generates a second encrypted version of the pairing key $K_p$ such that it is decryptable by second information $S_2$ securely stored in a second receiver module such as the conditional access module 206 (the second encrypted version of the pairing key $K_p$ therefore described as $E_{S_2}[K_p]$).

The service provider 102 can store a table or database relating STB IDs and the pairing keys $K_p$ for each of the provided services. FIG. 5C is an example of how such information may be stored. Note that the BRDCST ID column is not necessary in this case, because the identity of the service provider 102 is inherently known.

Figure 6:
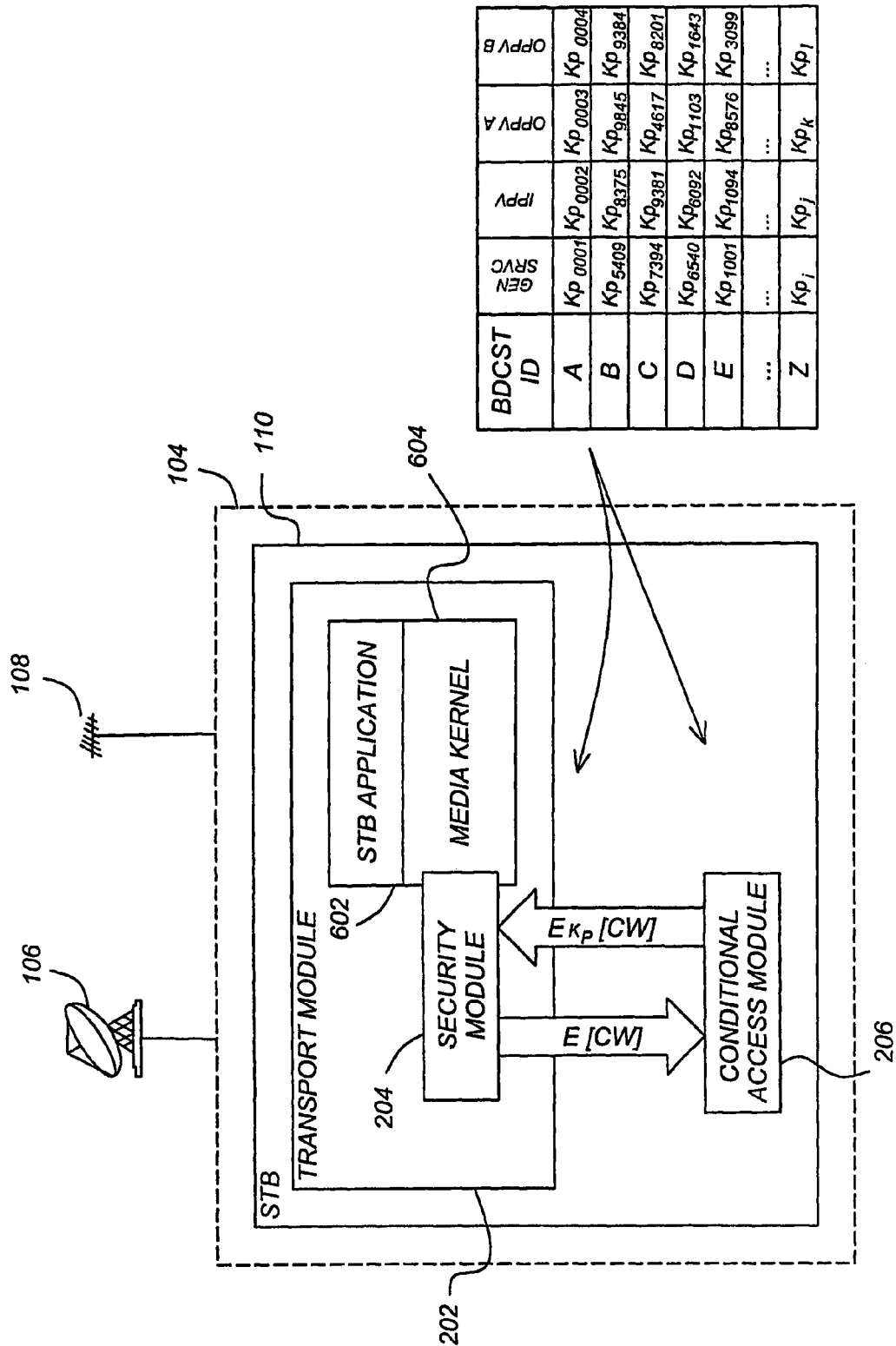
FIG. 6 is a diagram illustrating one embodiment of the STB.

In block 422, the service provider 102 transmits an entitlement control message (ECM) or an entitlement management message (EMM) to the subscriber station. The ECM is transmitted to the STB 110 in response to a subscriber request for access to general media programs from the service provider 102, while the EMM is transmitted in response to a subscriber request for a specific program (e.g. an impulse or order ahead pay-per-view). The ECM/EMM includes the first encrypted version of the applicable pairing key $E_{S_1}[K_p]$, the second encrypted version of the pairing key $E_{S_2}[K_p]$, and the ID of the service provider 102 (BRDCST ID) which is providing the services related to the pairing key $K_p$. This transmission can be accomplished via the same system used to transmit the media program M itself, or a different communication system such as the Internet or a public switched telephone network (PSTN) or cellphone network. In block 424, the transport module 304 receives the first encrypted version of the pairing key $E_{S_1}[K_p]$ and the second encrypted version of the pairing key $E_{S_1}[K_p]$, and the service provider ID. The second encrypted version of the pairing key $E_{S_1}[K_p]$ is provided to the conditional access module 310, where it is received, decrypted (using the second information $S_2$) to obtain the pairing key $K_p$ which is stored (along with a reference to the service provider ID (BRDCST ID) from which the pairing key $K_p$ was received), as shown in blocks 428 and 430. Similarly, the first encrypted version of the pairing key $E_{S_1}[K_p]$ is decrypted and stored in the transport module 304 (also along with a reference to the service provider ID from which the pairing key $K_p$ was received), as shown in block 432. FIG. 6 shows an exemplary embodiment of how the data relating services, broadcasters, and pairing keys $K_p$ might be stored in the transport module and the conditional access module.

Thereafter, the pairing key $K_p$ is used to encrypt communications between the conditional access module 206 and the transport module 202. Henceforward, the conditional access module 206 cannot be used a different STB 110, although if desired, more than one STB 110 can be provided to a customer, each having the same first information the conditional access module to be used with different STBs 110 in the same household.

To begin service, the broadcast module 506 and/or the broadcast headend 516 encrypts media programs M 510 according to a control word (CW), encrypts the control word (CW) itself, and broadcasts a program stream comprising the encrypted program material $E_{CW}[M]$ and the encrypted control word E[CW] to the STBs 100, as shown in blocks 450, 452 and 454. The program stream may also comprise program guide information from the program guide module 508.

The transport module 202 in the STB 110 receives the program stream, separates out the packets of information by channel (typically according to a packet ID), and provides the encrypted control word E[CW] to the conditional access module 206. The conditional access module 206 receives the encrypted control word E[CW] decrypts it to recover the control word (CW) encrypts the control word (CW) with the pairing key $K_p$, and provides the encrypted pairing key $E_{K_p}$[CW] to the transport module 202, as shown in blocks 460-466. Using an STB application 602 and media kernel 604, the transport module 202 decrypts the encrypted control word $E_{K_p}$[CW] using the pairing key $K_p$ thus recovering the control word (CW), as shown in block 472, and uses the decrypted control word (CW) to decrypt the encrypted media program $E_{CW}[M]$ to produce the media program M, as shown in block 474.

The foregoing system can be used to modify or change the provision of services from the service provider 102 as well. This can be accomplished by the service provider 102 deleting, adding, or modifying the pairing keys $K_p$ in cooperation with the pairing broker 304 in essentially the same way as described above. Such modification can occur at the subscriber's behest (e.g. the subscriber desires either more, less, or different services than previously), or that of the service provider 102 (e.g. if the offered services change or the subscriber's credit card is no longer valid).

The modules described above can be implemented as one or more software modules comprising instructions being performed by one or more special or general purpose processors, or may be implemented with hardware modules having dedicated circuitry, or with both hardware and software modules. In one embodiment, for example, the pairing broker 304 is implemented by a pairing server, and the program guide module 508, broadcast module 506, subscriber administration module 504 and web transaction module 502 are all implemented as servers, the transport module 202 and security module 204 are implemented in a secure, tamperproof electronic circuit, and the conditional access module is implemented on a smart card.

Figure 7:
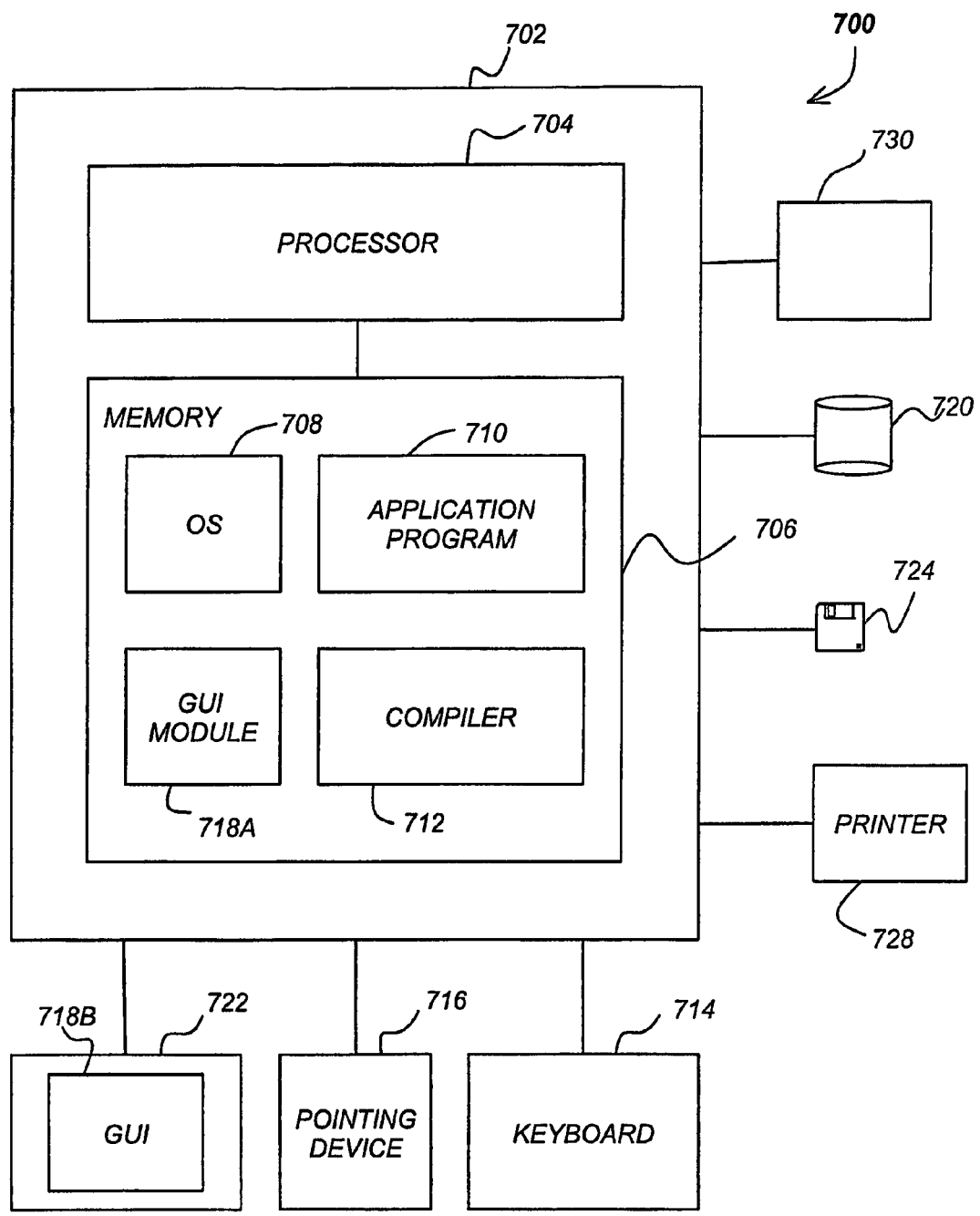
FIG. 7 is a diagram of a computer that can be used to implement selected modules.

FIG. 7 illustrates an exemplary computer system 700 that could be used to implement the servers or the subscriber computer 512 of the present invention. The computer 702 comprises a processor 704 and a memory, such as random access memory (RAM) 706. The computer 702 is operatively coupled to a display 722, which presents images such as windows to the user on a graphical user interface 718B. The computer system 702 may be coupled to other devices, such as a keyboard 714, a mouse device 716, a printer, etc. Of course, those skilled in the art will recognize that any combination of the above components, or any number of different components, peripherals, and other devices, may be used with the computer 702.

Generally, the computer 702 operates under control of an operating system 708 stored in the memory 706, and interfaces with the user to accept inputs and commands and to present results through a graphical user interface (GUI) module 718A. Although the GUI module 718A is depicted as a separate module, the instructions performing the GUI functions can be resident or distributed in the operating system 708, the computer program 710, or implemented with special purpose memory and processors. The computer 702 also implements a compiler 712 which allows an application program 710 written in a programming language such as COBOL, C++, FORTRAN, or other language to be translated into processor 704 readable code. After completion, the application 710 accesses and manipulates data stored in the memory 706 of the computer 702 using the relationships and logic that was generated using the compiler 712. The computer 702 also optionally comprises an external communication device such as a modem, satellite link, Ethernet card, or other device for communicating with other computers.

In one embodiment, instructions implementing the operating system 108, the computer program 710, and the compiler 712 are tangibly embodied in a computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of instructions which, when read and executed by the computer 702, causes the computer 702 to perform the steps necessary to implement and/or use the present invention. Computer program 710 and/or operating instructions may also be tangibly embodied in memory 706 and/or data communications devices 730, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of brokering the enabling of communication of encrypted media programs from a plurality of independent broadcasters to a plurality of receivers, each encrypted media program decryptable by a first receiver module securely communicating with a second receiver module according to a first pairing key $K_{p1}$ or a second pairing key $K_{p2}$ associated with one of the plurality of receivers, comprising the steps of:

transmitting a first broadcast service enabling request for a first broadcast service from one of the plurality of broadcasters to a broker independent from the one of the plurality of broadcasters, the request comprising an identification of the one of the plurality of receivers;

receiving a first encrypted version of the first pairing key $E_{S_1}[K_{p1}]$ in the one of the plurality of broadcasters from the broker, the first encrypted version of the pairing key $E_{S_1}[K_{p1}]$ decryptable by first information $S_1$ securely stored in the first receiver module of the one of the plurality of receivers;

generating a second encrypted version of the first pairing key $E_{S_1}[K_{p1}]$ in the one of the plurality of broadcasters, the second encrypted version of the first pairing key $E_{S_2}[K_{p1}]$ decryptable by second information $S_2$ securely stored in the second receiver module;

transmitting the first encrypted version of the first pairing key $E_{S_1}[K_{p1}]$ and the second encrypted version of the first pairing key $E_{S_2}[K_{p1}]$ to the one of the plurality of receivers;

transmitting a second broadcast service enabling request for a second broadcast service different from the first broadcast service from the one of the plurality of broadcasters to the broker, the second service enabling request comprising the identification of the one of the plurality of receivers;

receiving a first encrypted version of a second pairing key $E_{S_1}[K_{p1}]$ from the broker, the first encrypted version of the second pairing key $E_{S_1}[K_{p1}]$ decryptable by the first information $S_1$ securely stored in the first receiver module of the one of the plurality of receivers;

generating a second encrypted version of the second pairing key $E_{S_2}[K_{p2}]$, the second encrypted version of the pairing key $E_{S_2}[K_{p2}]$ decryptable by the second information $S_2$ securely stored in the second receiver module; and transmitting the first encrypted version of the second pairing key $E_{S_1}[K_{p2}]$ and the second encrypted version of the second pairing key $E_{S_2}[K_{p2}]$ to the one of the plurality of receivers;

wherein the first broadcast service is selected from a group consisting of:
- a general broadcast service from the one of the plurality of broadcasters, including access to a number of media channels as a baseline fee service;
- a particular media program from the one of the plurality of broadcasters; and
- a particular set of media programs from the one of the plurality of broadcasters; and wherein the first broadcast service is enabled by the first pairing key $K_{p1}$ and the second broadcast service is enabled by the second pairing key $K_{p2}$.

2. The method of claim 1, wherein the media program is encrypted according to a control word CW, and the method further comprising the steps of:
decrypting the first encrypted version of the first pairing key $E_{S_1}[K_{p1}]$ in the first receiver module;
decrypting the second encrypted version of the first pairing key $E_{S_2}[K_{p1}]$ in the second receiver module;
decrypting an encrypted version of the control word E[CW] in the second receiver module;
re-encrypting the decrypted control word CW according to the decrypted second encrypted version of the first pairing key $K_{p1}$;
providing the re-encrypted control word $E_{K_{p1}}[CW]$ from the second receiver module to the first receiver module; and
decrypting the re-encrypted control word $E_{K_{p1}}[CW]$ using the decrypted first encrypted version of the first pairing key $K_{p1}$.

3. The method of claim 1, wherein the media program is encrypted according to a control word CW, and the method further comprises the steps of:
decrypting the first encrypted version of the second pairing key $E_{S_1}[K_{p2}]$ in the first receiver module;
decrypting the second encrypted version of the second pairing key $E_{S_2}[K_{p2}]$ in the second receiver module;
decrypting an encrypted version of the control word E[CW] in the second receiver module;
re-encrypting the decrypted control word CW according to the decrypted second encrypted version of the second pairing key $K_{p2}$;
providing the re-encrypted control word $E_{K_{p2}}[CW]$ from the second receiver module to the first receiver module; and
decrypting the re-encrypted control word $E_{K_{p2}}[CW]$ using the decrypted first encrypted version of the second pairing key $K_{p2}$.

4. The method of claim 1, further comprising the steps of:
transmitting a third broadcast service enabling request for a third broadcast service from a second one of the plurality of broadcasters to the broker, the third broadcast service enabling request comprising the identification of the one of the plurality of receivers;
receiving a first encrypted version of a third pairing key $E_{S_1}[K_{p3}]$ from the broker, the first encrypted version of the third pairing key $E_{S_1}[K_{p3}]$ decryptable by the first information $S_1$ securely stored in the first receiver module of the one of the plurality of receivers;

generating a second encrypted version of the third pairing key $E_{S_2}[K_p] E_{S_2}[K_{p3}]$, the third encrypted version of the pairing key $E_{S_2}[K_{p3}]$ decryptable by the second information $S_2$ securely stored in the second receiver module; and transmitting the first encrypted version of the third pairing key $E_{S_1}[K_{p3}]$ and the second encrypted version of the third pairing key $E_{S_2}[K_{p3}]$ to the one of the plurality of receivers;

wherein the third broadcast service is selected from a second group consisting of:
- a general broadcast service from the second one of the plurality of broadcasters, including access to a number of media channels as a baseline fee service;
- a particular media program from the second one of the plurality of broadcasters, including an order ahead pay per view service and an impulse pay per view service; and
- a particular set of media programs from the second one of the plurality of broadcasters.

5. The method of claim 4, wherein the media program is encrypted according to a CW, and the method further comprises the steps of:
decrypting the first encrypted version of the third pairing key $E_{S_1}[K_{p3}]$ in the first receiver module;
decrypting the second encrypted version of the third pairing key $E_{S_2}[K_{p3}]$ in the second receiver module;
decrypting the an encrypted version of the control word E[CW] in the second receiver module;
re-encrypting the decrypted control word CW according to the decrypted second encrypted version of the third pairing key $K_{p3}$;
providing the re-encrypted control word $E_{K_{p3}}[CW]$ from the second receiver module to the first receiver module; and
decrypting the re-encrypted control word $E_{K_{p3}}[CW]$ using the decrypted first encrypted version of the third pairing key $K_{p3}$.

6. The method of claim 1, wherein the first broadcast service enabling request is transmitted in response to a first broadcast service request, the first broadcast service request transmitted from the one of the plurality of receivers to the one of the plurality of broadcasters.

7. The method of claim 6, wherein the first broadcast service request is transmitted via the Internet.

8. The method of claim 6, wherein the first broadcast service enabling request is transmitted only upon receipt of a valid credit card number.

9. The method of claim 1, wherein the first information $S_1$ and the second information $S_2$ is known to the broker and the one of the plurality of broadcasters.

10. The method of claim 1, wherein the first information $S_1$ is known to the broker and unknown to the plurality of broadcasters, and wherein the second information $S_2$ is known to the one of the plurality of broadcasters and unknown to the broker.

11. The method of claim 10, wherein the first information $S_1$ is a first secret.

12. The method of claim 11, wherein the first secret is unique to the one of the plurality of receivers.

13. The method of claim 1, wherein the first information $S_1$ is securely stored in first module of the one of the plurality of receivers.

14. The method of claim 10, wherein the second information $S_2$ is a second secret.

15. The method of claim 14, wherein the second secret is securely stored in the second module of the one of the plurality of receivers.

16. The method of claim 15, wherein the second module is a smart card removably coupleable to the first module.

17. The method of claim 15, wherein the second module is irremovably integrated with the receiver.

18. The method of claim 1, wherein the first pairing key or the second pairing key is generated by the one of the plurality of broadcasters and transmitted to the broker.

19. The method of claim 1, wherein the first pairing key or the second pairing key is generated by the broker and transmitted to the one of the plurality of broadcasters in response to the first service enabling request or the second service enabling request.

20. The method of claim 1, wherein:
the first encrypted version of the first pairing key $E_{S_1}[K_{p1}]$ consists of the first pairing key encrypted by first information $S_1$; and
the second encrypted version of the first pairing key $E_{S_2}[K_{p1}]$ consists of the first pairing key encrypted by second information $S_2$.

21. A system for brokering the enabling of communication of encrypted media programs from a plurality of independent broadcasters to a plurality of receivers, each encrypted media program decryptable by a first receiver module securely communicating with a second receiver module according to a first pairing key $K_{p1}$ and a second pairing key $K_{p2}$ associated with one of the plurality of receivers, the system comprising:
a broker, for providing a first encrypted version of the first pairing key $E_{S_1}[K_{p1}]$ in response to a first broadcast service enabling request for a first broadcast service from one of the plurality of broadcasters, the first broadcast service enabling request having an identification of one of the plurality of receivers, and for providing a first encrypted version of the second pairing key $E_{S_1}[K_{p1}]$ in response to a second broadcast service enabling request for a second broadcast service different from the first broadcast service; and
wherein the first encrypted version of the first pairing key $E_{S_1}[K_{p1}]$ is decryptable by first information $S_1$ stored in the first receiver module and wherein the first receiver module receives the first encrypted version of the first pairing key $E_{S_1}[K_{p1}]$ and a second encrypted version of the first pairing key $E_{S_2}[K_{p1}]$ from the one of the plurality of broadcasters, the second encrypted version of the first pairing key $E_{S_2}[K_{p1}]$ being generated by the one of the plurality of broadcasters and decryptable by second information $S_2$ stored in the second receiver module; and
wherein the first encrypted version of the second pairing key $E_{S_1}[K_{p2}]$ is decryptable by first information $S_1$ stored in the first receiver module and wherein the first receiver module receives the first encrypted version of the second pairing key $E_{S_1}[K_{p2}]$ and a second encrypted version of the second pairing key $E_{S_2}[K_{p2}]$ from the one of the plurality of broadcasters, the second encrypted version of the second pairing key $E_{S_2}[K_{p2}]$ being generated by the one of the plurality of broadcasters and decryptable by second information $S_2$ stored in the second receiver module;
wherein the first broadcast service is selected from a group consisting of:
a general broadcast service from the one of the plurality of broadcasters, including access to a number of media channels as a baseline fee service;
a particular media program from the one of the plurality of broadcasters; and
a particular set of media programs from the one of the plurality of broadcasters; and
wherein the first broadcast service is enabled by the first pairing key $K_{p1}$ and the second broadcast service is enabled by a second pairing key $K_{p2}$.

22. The system of claim 21, wherein the first information $S_1$ and the second information $S_2$ is known to the broker and the one of the plurality of broadcasters.

23. The system of claim 21, wherein the first information $S_1$ is known to the broker and unknown to the plurality of broadcasters, and wherein the second information $S_2$ is known to the one of the plurality of broadcasters and unknown to the broker.

24. The system of claim 21, wherein the first information $S_1$ is a first secret.

25. The system of claim 24, wherein the first secret is unique to the one of the plurality of receivers.

26. The system of claim 21, wherein the first information $S_1$ is securely stored in first module of the one of the plurality of receivers.

27. The system of claim 26, wherein the first module is a transport module.

28. The system of claim 21, wherein the second information $S_2$ is a second secret.

29. The system of claim 28, wherein the second secret is securely stored in the second module of the one of the plurality of receivers.

30. The system of claim 28, wherein the second module is a smart card removably coupleable to the first module.

31. The system of claim 28, wherein the second module is irremovably integrated with the receiver.

32. The system of claim 21, wherein the first pairing key or the second pairing key is generated by the one of the plurality of broadcasters and transmitted to the broker.

33. The system of claim 21, wherein the first pairing key or the second pairing key is generated by the broker and transmitted to the one of the plurality of broadcasters in response to the first broadcast service enabling request or the second broadcast service enabling request.

34. An apparatus for brokering the enabling of communication of encrypted media programs from a plurality of independent broadcasters to a plurality of receivers, each encrypted media program decryptable by a first receiver module securely communicating with a second receiver module according to a first pairing key $K_{p1}$ or a second pairing key $K_{p2}$ associated with one of the plurality of receivers, the apparatus comprising:
means for transmitting a first broadcast service enabling request for a first broadcast service from one of the plurality of broadcasters to a broker independent from the one of the plurality of broadcasters, the first broadcast service enabling request comprising an identification of the one of the plurality of receivers;
means for receiving a first encrypted version of the first pairing key $E_{S_1}[K_{p1}]$ in the one of the plurality of broadcasters from the broker, the first encrypted version of the pairing key $E_{S_1}[K_{p1}]$ decryptable by first information $S_1$ securely stored in the first receiver module of the one of the plurality of receivers;
means for generating a second encrypted version of the first pairing key $E_{S_2}[K_{p1}]$ in the one of the plurality of broadcasters, the second encrypted version of the first pairing key $E_{S_2}[K_{p1}]$ decryptable by second information $S_2$ securely stored in the second receiver module; and means for transmitting the first encrypted version of the first pairing key $E_{S_1}[K_{p1}]$ and the second encrypted version of the first pairing key $E_{S_2}[K_{p2}]$ to the one of the plurality of receivers;

means for transmitting a second broadcast service enabling request for a second broadcast service different from the first broadcast service from the one of the plurality of broadcasters to the broker, the second service enabling request comprising the identification of the one of the plurality of receivers;

means for receiving a first encrypted version of a second pairing key $E_{S_1}[K_{p2}]$ from the broker, the first encrypted version of the second pairing key $E_{S_1}[K_{p2}]$ decryptable by the first information $S_1$ securely stored in the first receiver module of the one of the plurality of receivers;

means for generating a second encrypted version of the second pairing key $E_{S_2}[K_{p2}]$, the second encrypted version of the pairing key $E_{S_2}[K_{p2}]$ decryptable by the second information $S_2$ securely stored in the second receiver module; and means for transmitting the first encrypted version of the second pairing key $E_{S_1}[K_{p2}]$ and the second encrypted version of the second pairing key $E_{S_2}[K_{p2}]$ to the one of the plurality of receivers;

wherein the first broadcast service is selected from a group consisting of:

a general broadcast service from the one of the plurality of broadcasters, including access to a number of media channels as a baseline fee service;

a particular media program from the one of the plurality of broadcasters; and a particular set of media programs from the one of the plurality of broadcasters; and wherein the first broadcast service is enabled by the first pairing key $K_{p1}$ and the second broadcast service is enabled by the second pairing key $K_{p2}$.

35. The apparatus of claim 34, wherein the media program is encrypted according to a control word CW, and the apparatus further comprises:

a first module for decrypting the first encrypted version of the first pairing key $E_{S_1}[K_{p1}]$; and a second receiver module for decrypting an second encrypted version of the first pairing key $E_{S_2}[K_{p1}]$, for decrypting an encrypted version of the control word E[CW], for re-encrypting the decrypted control word CW according to the decrypted second encrypted version of the first pairing key, and for providing the re-encrypted control word $E_{K_{p1}}[CW]$ from the second receiver module to the first receiver module;

wherein the first module further decrypts the re-encrypted control word $E_{K_{p1}}[CW]$ using the decrypted first encrypted version of the first pairing key $K_{p1}$.

* * * * *